United States Patent
King

[11] Patent Number: 6,145,236
[45] Date of Patent: Nov. 14, 2000

[54] INSECT REPELLING DEVICE

[76] Inventor: Randall King, 2544 Olympic View Dr., Chino Hills, Calif. 91709

[21] Appl. No.: 09/366,341

[22] Filed: Aug. 2, 1999

[51] Int. Cl.[7] .................................................. A01M 1/20
[52] U.S. Cl. ................................ 43/1; 43/131; 43/132.1; 119/28.5; 119/174
[58] Field of Search .................. 43/107, 124, 132.1, 43/131, 1; 119/174, 28.5, 51.01, 61; 5/417

[56] References Cited

U.S. PATENT DOCUMENTS

| | | | |
|---|---|---|---|
| 1,992,648 | 2/1935 | Browne | 4/177 |
| 2,677,350 | 5/1954 | Prestidge . | |
| 3,661,326 | 5/1972 | Wilson | 239/60 |
| 3,995,595 | 12/1976 | Williams | 119/61 |
| 4,319,423 | 3/1982 | Judd | 43/121 |
| 4,800,671 | 1/1989 | Olson | 43/108 |
| 4,804,142 | 2/1989 | Riley | 239/56 |
| 4,862,638 | 9/1989 | Stevenson | 43/114 |
| 5,107,620 | 4/1992 | Mahan | 43/112 |
| 5,109,800 | 5/1992 | Williams | 119/61 |
| 5,148,626 | 9/1992 | Haake, Sr. | 43/121 |
| 5,619,952 | 4/1997 | Walker | 119/61 |
| 5,784,995 | 7/1998 | Willinger | 119/28.5 |

*Primary Examiner*—Jack W. Lavinder
*Attorney, Agent, or Firm*—Goldstein & Canino

[57] ABSTRACT

An insect repelling device including a mat portion having a recess formed within an upper surface thereof. An insect repellent is disposed within the recess.

1 Claim, 2 Drawing Sheets

INSECT REPELLING DEVICE

BACKGROUND OF THE INVENTION

The present invention relates to an insect repelling device and more particularly pertains to preventing insects from bothering certain areas.

In the past, it has been the conventional practice to place trash, refuse, debris and the like into plastic bags for disposal in containers, such as barrels. Usually, the filled barrels or trash cans are located outside of a structure and the contents of the cans and barrels are attractive to crawling insects and pests, such as ants or the like. In other instances, animal food dishes similarly attract pests so that such cans, barrels and dishes are unsightly and unsanitary.

The present invention attempts to provide a device that will prevent these crawling insects from gaining access to trash cans and food dishes and other similarly situated items that attract insects. The present invention is comprised of a mat that is provided with insect repelling material that the dish or can is placed upon so that an insect will not approach these items because of the existence of the repellent while at the same time limiting or precluding human contact with the repellent.

The use of insect control devices is known in the prior art. More specifically, insect control devices heretofore devised and utilized for the purpose of controlling the amount of insects that infiltrate areas are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,109,800 to Williams discloses a barrier stand comprised of a circular strip coated with a deterrent, capable of being used for preventing crawling insects from reaching trash or food receptacles. U.S. Pat. No. 5,619,952 to Walker discloses an animal feeding device with a moat and pad used as a barrier to deter insects. U.S. Pat. No. 5,148,626 to Haake, Sr. discloses an insect barrier comprised of a spongy material incorporated with insecticide. U.S. Pat. No. 4,319,423 to Judd discloses a barrier structure comprised of a wire mesh for controlling such insects as slugs.

While these devices fulfill their respective, particular objective and requirements, the aforementioned patents do not describe an insect repelling device for preventing insects from bothering certain areas.

In this respect, the insect repelling device according to the present invention substantially departs from the conventional concepts and designs of the prior art, and in doing so provides an apparatus primarily developed for the purpose of preventing insects from bothering certain areas.

Therefore, it can be appreciated that there exists a continuing need for new and improved insect repelling device which can be used for preventing insects from bothering certain areas. In this regard, the present invention substantially fulfills this need.

SUMMARY OF THE INVENTION

In the view of the foregoing disadvantages inherent in the known types of insect control devices now present in the prior art, the present invention provides an improved insect repelling device. As such, the general purpose of the present invention, which will be described subsequently in greater detail, is to provide a new and improved insect repelling device and method which has all the advantages of the prior art and none of the disadvantages.

To attain this, the present invention essentially comprises a mat portion having a recess formed within an upper surface thereof. An insect repellent is disposed within the recess.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved insect repelling device which has all the advantages of the prior art insect control devices and none of the disadvantages.

It is another object of the present invention to provide a new and improved insect repelling device which may be easily and efficiently manufactured and marketed.

It is a further object of the present invention to provide a new and improved insect repelling device which is of durable and reliable construction.

An even further object of the present invention is to provide a new and improved insect repelling device which is susceptible of a low cost of manufacture with regard to both materials and labor, and which accordingly is then susceptible of low prices of sale to the consuming public, thereby making such an insect repelling device economically available to the buying public.

Even still another object of the present invention is to provide a new and improved insect repelling device for preventing insects from bothering certain areas.

Lastly, it is an object of the present invention to provide a new and improved insect repelling device including a mat portion having a recess formed within an upper surface thereof. An insect repellent is disposed within the recess.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

With reference now to the drawings, and in particular, to FIGS. 1 through 4 thereof, the preferred embodiment of the new and improved insect repelling device embodying the principles and concepts of the present invention and generally designated by the reference number 10 will be described.

Specifically, it will be noted in the various figures that the device relates to a insect repelling device for preventing insects from bothering certain areas. In its broadest context, the device consists of a mat portion and an insect repellent. Such components are individually configured and correlated with respect to each other so as to attain the desired objective.

In its most general sense, the mat portion 12 has a recess 14 formed within an upper surface thereof. The insect repellent 16 is disposed within the recess 14. Thus, a trash can, pet dish or the like can be placed on the upper surface of the mat portion 12 so that it would be surrounded by insect repellent 16 whereby crawling insects and the like would not be approaching.

Figure 1:
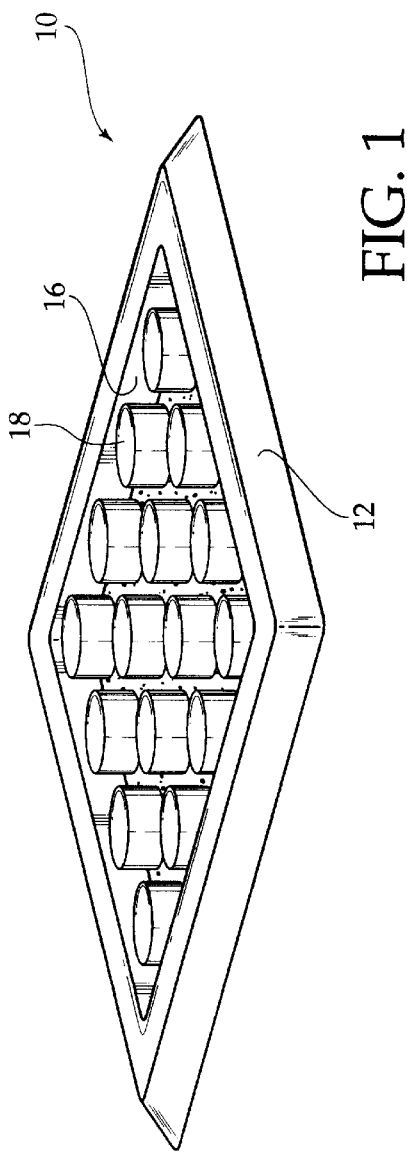
FIG. 1 is a perspective view of the preferred embodiment of the insect repelling device constructed in accordance with the principles of the present invention.

FIG. 1 illustrates the mat portion 12 in a generally square configuration with the recess 14 disposed in the center area thereof. The recess 14 has a plurality of cylindrical stands 18 disposed therein in a spaced relationship. The stands 18 have upper ends equal in height with the upper surface of the mat portion 12. The stands 18 allow the trash can or pet dish to be placed thereon so that there is no contact with the insect repellent 16.

Figure 2:
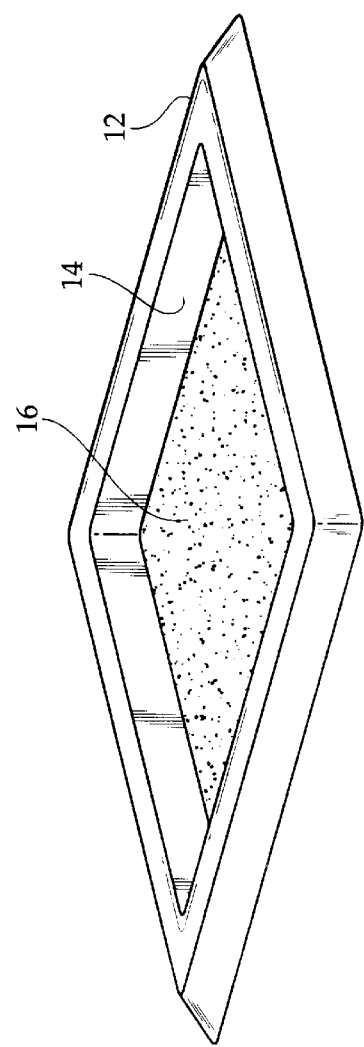
FIG. 2 is a perspective view of a second embodiment of the present invention.

A second embodiment of the present invention is shown in FIG. 2 and includes substantially all of the components of the present invention further including the mat portion 12 in a generally square configuration with the recess 14 formed in a central portion thereof. The recess 14 occupies at least 75% of a total area of the upper surface of the mat portion 12. This embodiment allows the trash can or pet dish to be placed directly within the recess 14.

Figure 3:
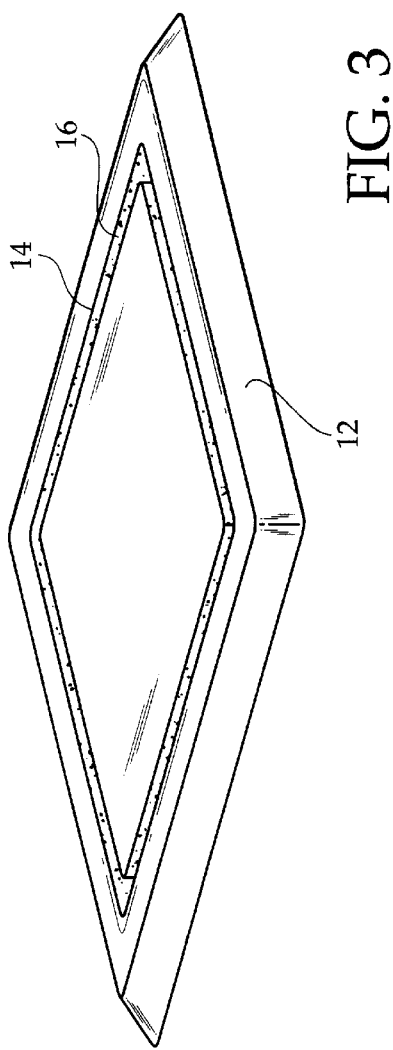
FIG. 3 is a perspective view of a third embodiment of the present invention.

A third embodiment of the present invention is shown in FIG. 3 and includes substantially all of the components of the present invention further including the recess 14 being in the form of a narrow groove extending around a peripheral edge of the upper surface of the mat portion 12. Thus, the central portion of the mat portion 12 provides a platform for placement of the trash can, pet dish, or the like thereon.

Figure 4:
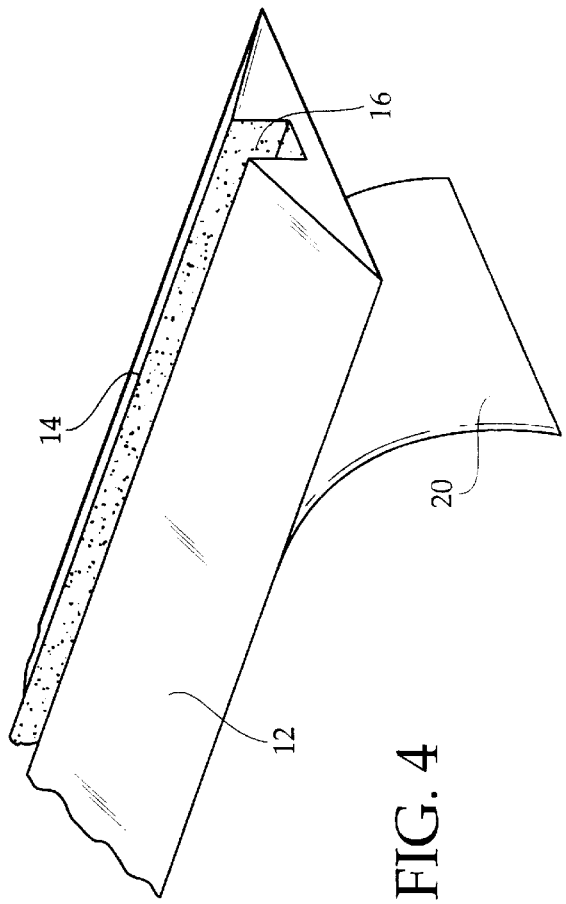
FIG. 4 is a perspective view of a fourth embodiment of the present invention.

A fourth embodiment of the present invention is shown in FIG. 4 and includes substantially all of the components of the present invention further including the mat portion 12 being in the form of an elongated strip with the recess 14 being in the form of a groove extending lengthwise in a center of the mat portion 12. An adhesive is disposed on a lower surface of the mat portion 12 to allow for securement to a ground area. A protective strip 20 would be placed on the adhesive prior to use. The elongated strip could be further designed to accommodate corners so that it could be effectively utilized.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An insect repelling device for preventing insects from bothering certain areas comprising, in combination:

a mat portion having a recess formed within an upper surface thereof, said mat portion having a generally square configuration with the recess formed in a central portion thereof, the recess occupying at least 75% of a total area of the upper surface of the mat portion;

wherein the recess has a plurality of cylindrical stands disposed therein in a spaced relationship, the stands having upper ends equal in height with the upper surface of the mat portion;

an insect repellent disposed within the recess.

* * * * *